US008135776B2

(12) United States Patent
Bremer, Jr.

(10) Patent No.: US 8,135,776 B2
(45) Date of Patent: Mar. 13, 2012

(54) SYSTEM AND METHOD FOR SCALABLE ARCHITECTURE FOR WEB-BASED COLLABORATIVE ANNOTATION OF PAGE-BASED DOCUMENTS

(75) Inventor: John F. Bremer, Jr., Bellingham, WA (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 12/276,848

(22) Filed: Nov. 24, 2008

(65) Prior Publication Data

US 2010/0131614 A1    May 27, 2010

(51) Int. Cl.
 *G06F 15/16* (2006.01)
(52) U.S. Cl. .......................... 709/203; 709/217; 715/738
(58) Field of Classification Search .................. 709/223, 709/224, 203, 217, 218, 229, 245
 See application file for complete search history.

(56) References Cited

U.S. PATENT DOCUMENTS

| 7,580,164 | B2 * | 8/2009 | Barrus et al. | 358/474 |
|---|---|---|---|---|
| 2002/0143736 | A1 * | 10/2002 | Krzyzaniak | 707/1 |
| 2004/0216032 | A1 * | 10/2004 | Amitay et al. | 715/500 |
| 2006/0033967 | A1 * | 2/2006 | Brunner | 358/474 |
| 2006/0072148 | A1 * | 4/2006 | Kovnat et al. | 358/1.15 |
| 2006/0101328 | A1 | 5/2006 | Albornoz et al. | |
| 2006/0136450 | A1 * | 6/2006 | Barrus et al. | 707/101 |
| 2007/0118794 | A1 * | 5/2007 | Hollander et al. | 715/512 |
| 2008/0270361 | A1 * | 10/2008 | Meyer et al. | 707/3 |
| 2008/0313546 | A1 * | 12/2008 | Nykamp | 715/738 |
| 2009/0161137 | A1 * | 6/2009 | Klave et al. | 358/1.13 |
| 2009/0204882 | A1 * | 8/2009 | Hollander et al. | 715/230 |
| 2010/0149601 | A1 * | 6/2010 | Baird et al. | 358/403 |
| 2011/0093462 | A1 * | 4/2011 | Meyer et al. | 707/736 |

\* cited by examiner

*Primary Examiner* — Lashonda Jacobs
(74) *Attorney, Agent, or Firm* — Harness, Dickey & Pierce, P.L.C.

(57) ABSTRACT

A system for managing the communication of multi-page documents. The system may use a software module document splitter adapted to receive a multi-page document being uploaded as a single file and to split the multi-page document into a plurality of independent files, with each independent file representing a single page of the document. The software module document splitter may also associate meta data with each single page that enables the single pages to be downloaded, one at a time, by an electronic device being used by a user, from a file storage device remote from the electronic device. This provides the appearance to the user that the electronic device is in possession of single, multi-page file.

16 Claims, 2 Drawing Sheets

SYSTEM AND METHOD FOR SCALABLE ARCHITECTURE FOR WEB-BASED COLLABORATIVE ANNOTATION OF PAGE-BASED DOCUMENTS

This invention was made with Government support under F19628-01-D-0016 awarded by the Air Force. The government has certain rights in this invention.

FIELD

The present disclosure relates managing the communication of page-based documents over a wide area network, and more particularly to a system and method that splits page-based document files into a plurality of independent files, with each file representing a single page of the page-based document, to ease the transfer and use of large page-based document files.

BACKGROUND

The statements in this section merely provide background information related to the present disclosure and may not constitute prior art.

Web-based collaborative annotation of high-value, deliverable product documents as part of a formal document review process saves time and money when compared to traditional face to face meetings or marked-up document exchange. Web-based collaborative annotation of deliverable product documents can also save time and money when compared to alternative review processes such as "Webex" style real-time collaboration, which requires all participants to work together at the same time.

When using Web-based collaborative annotation, the documents involved sometimes need to be exchanged over a wide area network, for example, the Internet, in one or more well known page-based document formats (instead of HTML) such as the Adobe® Portable Document Format (PDF), the Microsoft PowerPoint® or Microsoft WORD® legacy or XML formats, and the Microsoft XML Paper Specification (XPS). This is particularly true with U.S. governmental entities such as the United States Air Force and the United States Navy which often require PDF documents. In In some cases deliverable documents will have a contractual requirement for formal draft review and comment disposition tracking. While presently existing, known web-based systems may support comment disposition tracking, such systems often are constrained by the normal limitations of a web architecture in handling large PDF or Microsoft OFFICE® (i.e., POWER POINT® or XPS type documents). Such limitations may include limited network bandwidth, web server memory limitations and web browser memory limitations on the size of the files that can be loaded.

Often the size of PDF, POWERPOINT® or XPS versions of deliverable product documents greatly exceeds the maximum size that a standard wide area network architecture can handle. In many instances there may be a need to transfer documents that may contain many thousands of pages.

A typical solution to the large document problem is to break the large document down into a plurality of smaller documents that each have more manageable size. However, estimating the ideal size and breaking the documents up is an ad hoc manual process. Moreover, the "ideal" size of the document is often difficult to determine with a distributed group of users connecting from different locations with different computer hardware via different networks and firewalls.

SUMMARY

In one aspect the present disclosure is related to a system for managing the communication of multi-page documents. The system may comprise a software module document splitter adapted to receive a multi-page document being uploaded as a single file and to split the multi-page document into a plurality of independent files, with each independent file representing a single page of the document. The software module document splitter may also associate meta data with each single page that enables the single pages to be downloaded, one at a time, by an electronic device being used by a user, from a file storage device remote from the electronic device. This provides the appearance to the user that the electronic device is in possession of a single, multi-page file.

In another aspect the present disclosure is related to a method for managing communication of a page-based document file between first and second electronic devices. The method may comprise receiving a page-based document file having a plurality of pages of information from the first electronic device and splitting the page-based document into a plurality of independent files. Each one of the plurality of independent files may represent a single page of the page-based document file. Meta data may be stored concerning the page-based document file with each one of the plurality of independent files. The independent files are provided with the meta data, one at a time, to the second electronic device.

In still another aspect the present disclosure is related to a method for managing communication of a page-based document file between first and second electronic devices over a wide area network (WAN). The method may comprise uploading a page-based document file from a browser of the first electronic device over the WAN to a document splitter module, with the page-based document having a plurality of pages of information. The document splitter module is used to split the page-based document into a plurality of independent files, with each one of the plurality of independent files representing a single page of the page-based document file. Meta data is stored concerning the page-based document file with each one of the plurality of independent files. The plurality of independent files are downloaded with the meta data, one at a time, in response to page requests communicated from a browser of the second electronic device over the WAN.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
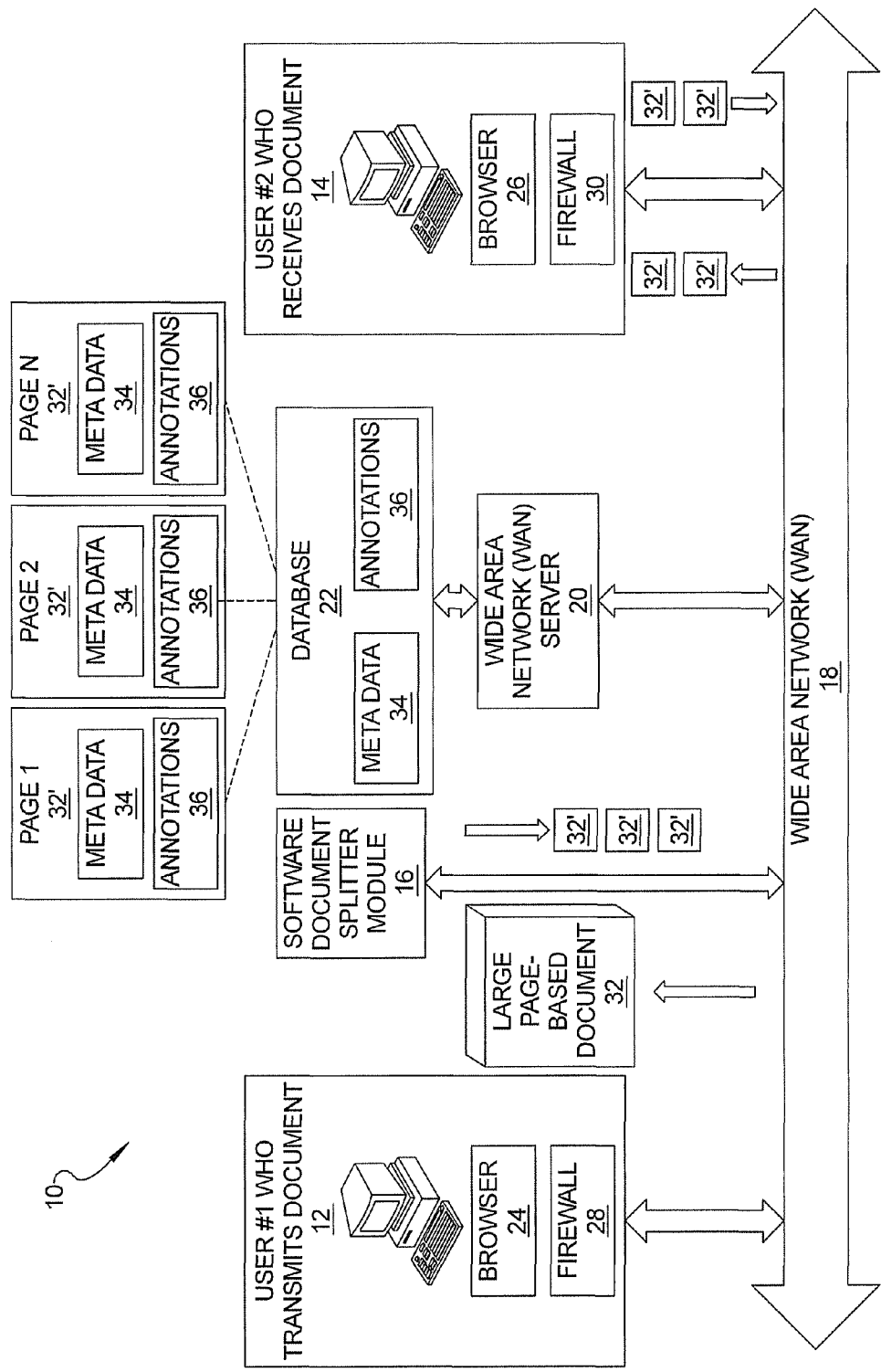
FIG. 1 is a block diagram of a system in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a system 10 in accordance with one aspect of the present disclosure. The system 10 generally may include a first electronic device 12, a second electronic device 14, a software document splitter module 16, a wide area network (WAN) 18, a WAN server 20, and a database 22. The electronic devices 12 and 14 may be personal computer devices such as desktop computers, laptops or any personal electronic device that enables a user to receive electronic documents and review and/or edit such documents. Typically the first electronic device 12 has a browser 24 operating on it, while the second electronic device 14 also has a browser 26 operating on it. The first and second electronic devices 12 and 14 also may each include a firewall 28 and 30, respectively.

The first electronic device 12 may transmit a page-based document file 32 that may include tens, hundreds or even thousands of pages of information. Such a file may be in the form of one of many well known formats, for example the ADOBE® Portable Document Format (PDF), or the Microsoft ("MS") OFFICE® format or XPS formats, just to name a few. In all cases, however, these documents represent page-based documents that are contained as a single large data file. As such, when they are transmitted over a WAN, for example the World Wide Web (hereinafter simply "Web"), they are transmitted as a single "block" of information. In many industries, particularly the aerospace industry, it is common and necessary to share large page-based PDF, Microsoft OFFICE® or XPS documents between users connected by the Web. When such documents contain hundreds or even thousands of pages, it becomes difficult or impossible to communicate such documents because of limited memory capability of the computing devices used and possible bandwidth constraints of the wide area network. This has necessitated that a user manually split a large page-based document into a plurality of separate, smaller documents before transmitting them over the wide area network to a different user. As will be appreciated, this is time consuming, and the user performing the splitting typically must guess how small each of the sub-files must be made (i.e., in bytes of information) so that all of the other users who may be using the sub-files will be able to easily use the sub-files.

Using the system 10, the consistent size of the split single page files also allows the page-based documents to be stored in a standard relational database such as MS SQL Server, rather than in a file system. This is because the geometry of the database field can be defined such that the single page file size will not exceed the maximum size of the data allowed in the database field. Furthermore, the speed with which the WAN server 20 can fetch the single page from the database 22 is consistently fast. Conversely, if the documents were stored as large, multipage monolithic files in the database the geometry of the database files would have to be adjusted to the largest file that might be stored, and the speed of database transfer between the web server and database would degrade and become unworkable as the file size increased.

The above document splitting operation is performed automatically by the system 10 through the software document splitter module 16. For convenience this component will be referred to hereinafter simply as the "splitter module 16". The splitter module 16 receives the large multi-page page-based document 32 over the WAN 18 and splits it into single pages 32'. Thus, each of pages 32' represents one specific page of the page-based document 32. The splitter module 16 further copies meta data associated with page-based document 32 into each of the separate pages 32'. Meta data includes information that the current document was originally page n of x number of pages of the original document y. Meta data might also include global information from the original document including table of contents information.

The separate pages 32' are then transmitted by the splitter module 16 back over the WAN 18 to the WAN server 20. The WAN server 20 stores the separate pages 32' in the database 22. The meta data associated with each page may be stored separately in the database 22, as indicated by block 34. However, the splitter module 16 may also embed meta data such as the original page number of the document and the original name and location of its parent document in each separate page 32' of the split document. Both approaches may be implemented by the system 10. Annotations made by a user to any one or more of the separate pages 32' may also be stored separately in the database 22, as indicated by annotations box 36. However, when the separate pages 32' are retrieved from the database 22 upon a request from the second electronic device 14, the database 22 will also fetch any annotations associated with the specific page 32' being requested. Thus, each separate page 32' may include the meta data of the page-based document 32 as well as any annotations associated with the particular, requested page 32'. Alternatively, the annotations could be fetched by the database 22 and transmitted separately by the WAN server 20, and then combined with their associated pages 32' at the second user's browser 26.

The meta data provided with each separate page 32' facilitates the normal appearance and behavior of the original page-based document 32 for "NEXT", "PREVIOUS" AND "GO-TO" page operations being requested by the user of the second electronic device 14. The user of the second electronic device 14 may request specific pages 32' via any of the "NEXT", "PREVIOUS" or "GO-TO" buttons in the specific page 32' he/she is viewing, and the user may also add or modify annotations existing in the specific page 32' being viewed. Any new annotations made to a given page 32' are then sent from the browser 26 of the second electronic device 14 back to the WAN server 20 where the new annotations are stored in the database 22 by the WAN server.

Because PDF and XPS and the MS OFFICE® 2007 XML file formats "pptx", "docx" and "xIsx" are all published standards, there are many ways one can split out a multi-page document in one of these formats into individual pages. One such way is by writing code that reads the file directly and extracts the pages or by using an open source or third party library of calls that one integrates into the code. Still further, one may use an application programming interface (API) exposed by an application associated with the file type, for example ACROBAT®, WORD®, POWERPOINT®, etc.

As an additional example, one may remotely control ACROBAT® from another program and have it split out the pages of a large multi-page document into separate files (i.e., where each file represents a single page). Similarly, one could remotely control MS WORD® from its COM API and have it save out a large multi-page document as individual page files. In any case, it will be appreciated that many conventional methods may be used to physically split a page-based document locally. The specific methodology one chooses will likely be dependent on various considerations such as performance, licensing considerations, or some other practical consideration such as the specific operating system and software the users already have installed on their devices.

As an additional specific example, if one was going to convert a POWERPOINT® presentation to PDF for reviewing. It may be quickest and most robust to remotely control the POWERPOINT® application and save the pages of a multi-page document out one at a time using the native support for saving as PDF in MS OFFICE® 2007, rather than doing it some other way, such as by converting the entire POWERPOINT® to PDF and then using ACROBAT® to split the PDF into pages.

Figure 2:
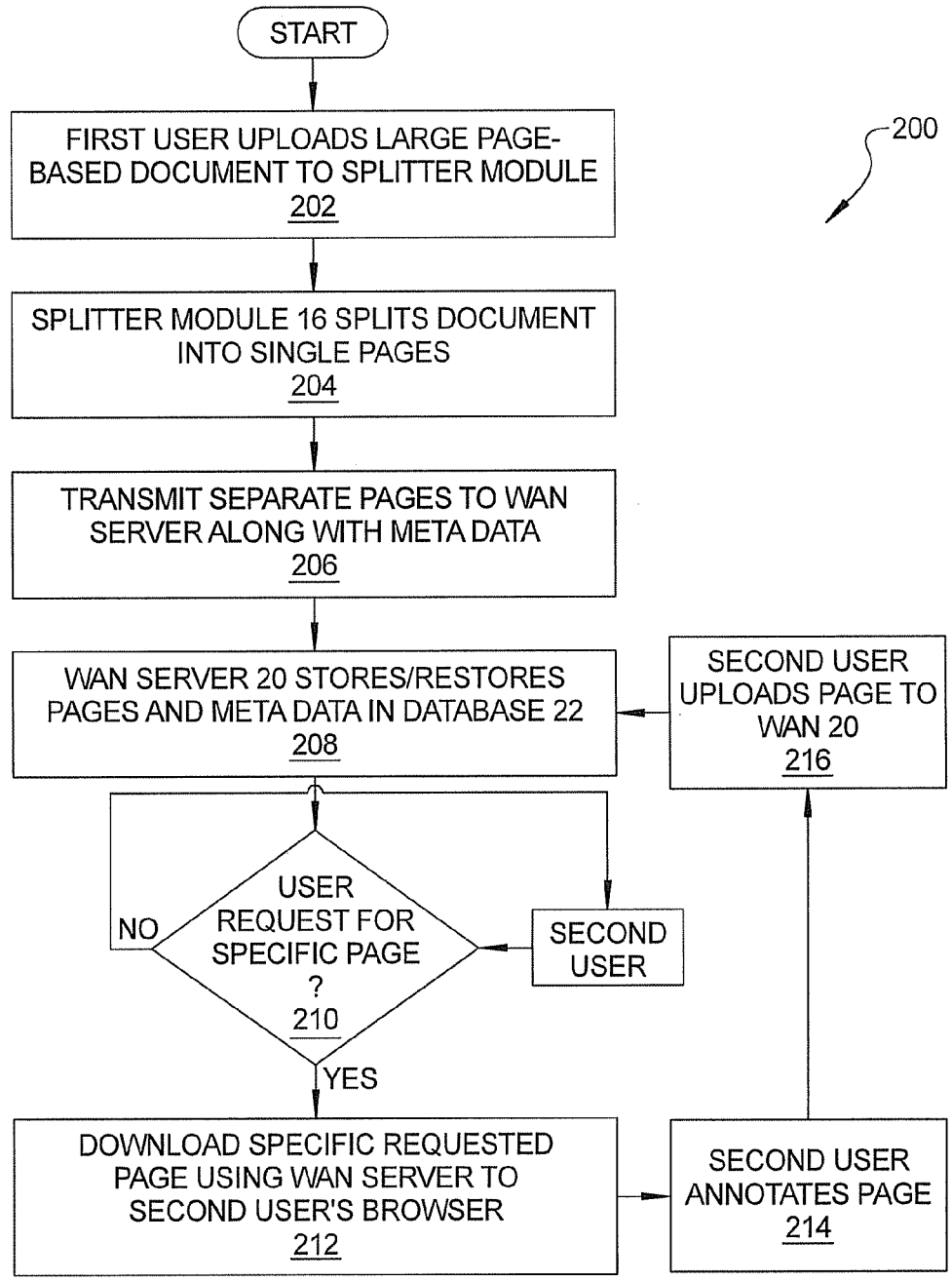
FIG. 2 is a flowchart of operations performed by the system of FIG. 1.

Referring now to FIG. 2, a flowchart 200 is shown illustrating operations performed by the system 10 in splitting the large page-based document 32 into the separate pages 32' and handling associated annotations with each specific page 32'. At operation 202 the first user uses his/her electronic device 12 and its associated browser 24 to upload the large page-based document 32 via the WAN 18 to the splitter module 16. The splitter module splits the single, large page-based document into separate pages, as indicated at operation 204. Thus, if the page-based document was 1000 pages in length, then the splitter module 16 would generate 1000 separate pages 32'. The separate pages 32' are then transmitted back over the WAN 18 to the WAN server 20, as indicated at operation 206, along with the meta data associated with the page-based file 32.

The WAN server 20 stores each of the pages 32' in the database 22 along with the meta data and any annotations that were associated with the page-based document 32, as indicated at operation 208. The annotations may be stored in their native format (e.g., PDF, XHTML, WORD® format, etc.). At operation 210 the WAN server 20 responds to a request for a specific page 32' of the stored document being made by the second user from the second electronic device 14 by downloading the specific, requested page 32' to the browser 26 of the second electronic device 14, as indicated at operation 212. Any annotations associated with the requested page 32' are dynamically imported into the page 32' as it is provided to the WAN server 20.

At operation 214 the user may then add or modify any annotations existing on the just-received page before uploading it back to the WAN server 20. At operation 216 the second user then uploads the annotations to the WAN server 20, which then stores them in the database 22. Thus, when a user creates an annotation in a specific page 32' and submits it back to the WAN server 20, only that new annotation needs to be transmitted back to the database 22, not the entire specific page 32' document. Each annotation contains information about where it goes in the document 32 (i.e., exactly which page and where) and is dynamically inserted back into the specific page 32' when that specific page is again recalled by the same user or a different user.

The system 10 and method of the present disclosure thus enables large page-based document files to be handled easily by multiple users by splitting and saving such documents as separate pages. To the user downloading the separate pages 32' from the WAN server 20 it appears essentially as if the user's electronic device 14 has possession of the entire large document file, when in fact the user's browser 26 only has possession of one page 32' of the document 32 at a time. The system 10 makes it significantly easier for large documents to be communicated to a user who is using electronic equipment that may have limited processing power and memory capacity, and which would therefore present significant challenges to the user's equipment in working with a page-based document having hundreds or thousands of pages.

A specific advantage of the system 10 is that it provides for convenient and easy to make network-based collaborative annotations to page-based documents. Thus, various users at different locations that are accessing a wide area network may each download one page at a time of a large, page-based document, create any needed annotations, and upload each annotation back to the WAN server 20. The next user who downloads that specific page receives the annotations made by the previous user, and he/she may then add any further annotations before uploading the further annotated page back to the WAN server 20.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for managing the communication of multi-page documents, comprising:
   a software module document splitter, configured to run on a processor, and adapted to:
   receive a multi-page, electronic document being uploaded as a single file;
   split the multi-page, electronic document into a plurality of single pages;
   save the single pages such that each one of said single pages may be transmitted separately over a network;
   associate meta data with each said single page that enables said single pages to be downloaded, one at a time, by an electronic device being used by a user, from a file storage device remote from said electronic device, to provide the appearance to the user that said electronic device is in possession of a single, multi-page document; and
   associate annotations made by individuals on specific pages of said multi-page, electronic document with specific ones of said single pages when said single pages are downloaded to said electronic device of said user, such that said annotations appear on said single pages as said annotations were initially authored by said individuals.

2. The system of claim 1, further comprising a wide area network over which said multi-page, electronic document is uploaded to said software module.

3. The system of claim 2, wherein said wide area network is used to download each one of said single pages to said electronic device of said user.

4. The system of claim 1, further comprising a wide area network over which the multi-page, electronic document and the single pages are transmitted.

5. The system of claim 4, further comprising a wide area network file server in communication with said wide area network, said software document splitter and said electronic device of said user.

6. The system of claim 5, further comprising a database in communication with said wide area network file server.

7. The system of claim 6, wherein said meta data is also stored in said database.

8. A method for managing communication of a page-based document file between first and second electronic devices, comprising:
   receiving a page-based electronic document file having a plurality of pages of information from said first electronic device;
   splitting, using a processor, said page-based electronic document into a plurality of independent files, with each one of said plurality of independent files representing a single page of said page-based document file;
   saving each of said independent files as a separate independent file such that each said independent file may be transmitted separately over a network;
   storing meta data concerning said page-based, electronic document file with each one of said plurality of saved independent files;

providing said plurality of saved independent files with said meta data, one at a time, to said second electronic device; and further comprising storing annotations made by one or more users on said page-based, electronic document on specific pages of said page-based, electronic document, separately from said plurality of saved independent files in said database; and associating said annotations with specific ones of the pages that said annotations are related to when said independent files corresponding to said specific pages are retrieved from storage and presented for viewing to a user.

9. The method of claim 8, wherein said receiving a page-based, electronic document file from said first electronic device comprises receiving a page-based document file over a wide area network at a remotely located document splitter module.

10. The method of claim 9, further comprising using a file server in communication with said wide area network to communicate said page-based, electronic document to said document splitter module.

11. The method of claim 10, further comprising using said file server to receive document page requests made by said second electronic device over said wide area network, and to obtain and provide specifically requested ones of said plurality of saved independent files being requested by said second electronic device back over said wide area network to said second electronic device.

12. The method of claim 8, wherein said providing said plurality of saved independent files with said meta data comprises providing said plurality of saved independent files over a wide area network.

13. A method for managing communication of a page-based, electronic document file between first and second electronic devices over a wide area network (WAN), comprising:

uploading a page-based, electronic document file from a browser of said first electronic device over said WAN to a document splitter module, configured to run on a processor, said page-based, electronic document file having a plurality of pages of information;

using said document splitter module, configured to run on a processor, to split said page-based, electronic document file into a plurality of independent files, with each one of said plurality of independent files representing a single page of said page-based, electronic document file;

saving each one of said independent files in a database such that each said independent file is able to be transmitted separately over a network;

storing meta data concerning said page-based, electronic document file with each one of said plurality of saved independent files;

storing annotations made by one or more users on said page-based, electronic document file on specific pages of said page-based, electronic document file, separately from said plurality of independent files in said database;

downloading said plurality of saved independent files with said meta data, one at a time, in response to page requests communicated from a browser of said second electronic device over said WAN; and prior to said downloading, associating said annotations with specific ones of the pages that said annotations are related to when said specific pages are retrieved from storage and presented to said browser for viewing by a specific user.

14. The method of claim 13, further comprising using a WAN server in communication with said WAN to facilitate communication with said browsers of said first and second electronic devices.

15. The method of claim 13, further comprising storing said annotations associated with said pages of said page-based document separately from said pages.

16. The method of claim 13, further comprising storing said meta data and said annotations associated with said pages of said page-based, electronic document file in a database separately from said plurality of saved independent files, and providing said meta data and said annotations along with associated, specific ones of said plurality of saved independent files in response to said page requests from said browser of said second electronic device.

\* \* \* \* \*